(12) United States Patent
Hjertman et al.

(10) Patent No.: US 6,392,223 B1
(45) Date of Patent: May 21, 2002

(54) TILT SENSING DEVICE AND METHOD FOR ITS OPERATION

(75) Inventors: Birger Hjertman, Vällingby; Anders Holte, Täby, both of (SE)

(73) Assignee: Pharmacia AB, Stockholm (SE)

( * ) Notice: Subject to any disclaimer, the term of this patent is extended or adjusted under 35 U.S.C. 154(b) by 0 days.

(21) Appl. No.: 09/180,494

(22) PCT Filed: May 16, 1997

(86) PCT No.: PCT/SE97/00806

§ 371 Date: Jun. 28, 1999

§ 102(e) Date: Jun. 28, 1999

(87) PCT Pub. No.: WO97/44636

PCT Pub. Date: Nov. 27, 1997

Related U.S. Application Data
(60) Provisional application No. 60/018,875, filed on May 29, 1996.

(30) Foreign Application Priority Data

May 21, 1996 (SE) .............................................. 9601924

(51) Int. Cl.[7] .................................................. G01D 5/34
(52) U.S. Cl. ..................... 250/231.1; 250/221; 250/239; 33/366.11
(58) Field of Search .............................. 250/231.1, 221, 250/222.1, 216, 239; 33/366.11, 366.12, 366.23, 366.24, 391; 73/514.19, 514.26

(56) References Cited

U.S. PATENT DOCUMENTS

| | | | |
|---|---|---|---|
| 2,303,360 A | 12/1942 | Irwin et al. ..................... 33/312 |
| 2,540,974 A | 2/1951 | Warren ..................... 200/61.52 |
| 3,097,565 A | 7/1963 | Kupelian ..................... 89/1.814 |
| 3,813,556 A | * 5/1974 | Beer et al. ..................... 250/575 |
| 4,450,353 A | 5/1984 | Sjolund ..................... 250/231.1 |
| 5,030,955 A | 7/1991 | Durst et al. ..................... 341/176 |
| 5,148,604 A | * 9/1992 | Bantien ..................... 33/366.12 |
| 5,202,559 A | 4/1993 | Durst ..................... 250/231.1 |
| 5,317,810 A | 6/1994 | Isono et al. ..................... 33/366.16 |
| 5,373,153 A | 12/1994 | Cumberledge et al. .. 250/231.1 |
| 5,425,179 A | 6/1995 | Nickel et al. ..................... 33/366.16 |
| 5,428,519 A | 6/1995 | Cwalinski ..................... 250/227.21 |
| 5,430,532 A | * 7/1995 | Ueda et al. ..................... 399/263 |
| 5,459,489 A | 10/1995 | Redford ..................... 345/179 |
| 6,011,254 A | * 1/2000 | Sano et al. ..................... 250/231.1 |

FOREIGN PATENT DOCUMENTS

| | | |
|---|---|---|
| GB | 2016850 | 9/1979 |
| GB | 2072838 | 10/1981 |
| GB | 2168149 | 6/1986 |

* cited by examiner

*Primary Examiner*—Stephone Allen
(74) *Attorney, Agent, or Firm*—Dinsmore & Shohl LLP

(57) ABSTRACT

A tilt sensing device and method for its operation, the device being of the type comprising (a) a housing, (b) a radiation transmitter and a radiation receiver arranged in or at the housing to form a beam path therebetween, (c) a radiation obstructing or deflecting body movable in relation to the beam path and (d) a rest surface for the body defining at least two possible rest positions for the body can move by gravity at defined tilt angles for the device and which rest positions are selected to give a detectable output difference from the radiation receiver depending on which of the rest positions is occupied by the body. The size of the movable body, expressed as the diameter of a sphere of corresponding volume, is less than 10 mm. Operation of the device includes monitoring the output from the receiver to obtain an amplitude versus time function and processing data from the function to obtain a modified signal.

70 Claims, 3 Drawing Sheets

TILT SENSING DEVICE AND METHOD FOR ITS OPERATION

This application claim benefit to Provisional 60/018,875 filed May 29, 1996

TECHNICAL FIELD

The present invention relates to a tilt sensing device and method for its operation, the device being of the type comprising a) a housing, b) a radiation transmitter and a radiation receiver arranged in or at the housing to form a beam path therebetween, c) a radiation obstructing or deflecting body movable in relation to the beam path and d) a rest surface for the body defining at least two possible rest positions for the body relative the beam path between which rest positions the body can move by gravity at defined tilt angles for the device and which rest positions are selected to give a detectable output difference from the radiation receiver depending on which of the rest positions is occupied by the body.

BACKGROUND

Tilt or inclination sensing or switching devices are known or can be used for a variety of purposes, such as for roll-over alarms in vehicles, level sensors, borehole deviation measuring instruments, patient emergency alarms, car burglar alarms, remote control or manipulation devices, safety switches in hazardous devices etc.

Also a variety of techniques have been employed for detecting the device angular orientation in relation to gravity. Early types relied on a conductive liquid, notably mercury, enclosed in an ampoule with penetrating electrodes. Other detectors based on liquid, as exemplified by U.S. Pat. No. 5,425,179, have been presented but there is a general problems with the presence of liquids in case of failure and among others surface tension and liquid adhesion require a certain minimum size for reliable operation and detection. Another type, as exemplified by U.S. Pat. No. 2,303,360 and U.S. Pat. No. 2,540,974, uses a rolling member movable at certain angles to either press an electrical switch or to bridge a gap in an electrical circuit in order to give a detectable signal. These devices are susceptible to wear, oxidation and contamination and require a minimum size to provide the necessary contact pressure for reliable switching and generally cannot be devised to give a continuous response to inclination angle.

Optical devices with members movable in a beam path between a transmitter and a receiver avoids several of the abovesaid problems. One type, as represented by U.S. Pat. No. 3,097,565, has its movable member suspended as a pendulum in the beam path but is suitable only for small angle deviations and generally requires a liquid dampening of the member. Another type uses an opaque sphere movable over a concave floor centered around the beam axis. Known devices of this type, e.g. U.S. Pat. No. 4,450,353 and GB 2 072 838, are unsuitable for miniaturization and use in portable devices, among others due to the floor design, the necessary large sphere movement, the damping liquid and unreliable response in an upside-down orientation. The U.S. Pat. No. specifications 5,202,559 and 5,030,955 disclose similar tilt responsive devices for use in hand-held remote control applications with multiple channel output. The optical devices described have several features counteracting further improvements, for example by the large lateral sphere movement required, the restriction to digital type output by prepared discrete positions and the reliance on complete optical sealing with certain contact pressure for position detection, all requiring a certain minimum device size.

As known designs are not optimal for use in e.g. truly portable devices, there is a continuing need for small, simple and cheep optical tilt sensing devices which are not restricted to certain tilt conditions, yet have a high and long lasting operating reliability. Several problems arise when trying to push current technology further towards these goals. Miniaturization gives certain reliability problems such as increased sensitivity to impurities. Less space for lateral movements in relation to the beam deteriorates signal to noise ratio. In spite of the limited space, in most portable applications the device has to provide a stable signal in upside-down orientation and furthermore a high degree of reliability is necessary as the devices are frequently used as part of safety systems to prevent hazardous conditions or prevent misuse.

SUMMARY OF THE INVENTION

A principal object of the present invention is to offer a tilt sensing device and a method for its operation obviating the abovestated disadvantages. A more specific object is to offer such a device suitable for use in portable instruments or articles. Another object is to provide such a device of overall small size and low weight. A further object is to provide such a device of reliable long term operation and predictable switching properties. Still another object is to provide such a device requiring but small internal body movements for reliable tilt detection. Yet another object is to offer such a device with reliable operation in upside-down orientation. Still another object is to offer such a device permitting continuous response to tilt angle. A further object is to offer such a device able to be devised for a broad range of tilt angles. Still another object is to provide such a device with the option of a roll orientation independent response.

These objects are reached with a device and a method of the initially stated nature having the characteristics set forth in the appended claims.

While prior art devices generally uses large movable bodies to provide great forces or efficient optical shielding or sealing the current invention utilizes a small body to reach several of the objects outlined. A small body size has proven to be a first prerequisite for reduced overall device dimensions. Within a given space a small body can make a larger relative motion with respect to the beam path, hereby giving a larger detectable signal alteration, which, although advantageous as such, with preference can be utilized to improve on signal to noise ratio and to compensate for less efficient sealing in small devices, hereby allowing for still further size reductions. The movable body, commonly fabricated of heavy material, is potentially destructive to the device interior parts, especially when damping liquids are not present. In fixed or permanent installations this is not a severe problem as the body usually makes small movements relative a rest surface or single discrete jumps at defined angles. In contrast, portable devices typically are turned in every possible direction and are subjected to repeated rough handling including drops and vibrations, under which conditions the body may act to damage its surroundings or at least cause long term deteriorated function from continuous wear and accumulated debris. Movable body size reduction in itself act to strongly reduce these problems as the body weight falls off with third power of linear dimensions and at small body weights and sizes even a surrounding gas medium begin to act as a dampening fluid. Further, when relying on beam path shielding rather than transmitter/receiver window sealing, presence of small amounts of particles are not detrimental to function. Also, when using shielding rather than sealing, proximity of transmitter and receiver becomes increasingly important and a smaller body allows these parts to be further approached, which, contrary to common thinking, compensates for less than complete shielding. According to a preferred embodiment the shielding rather than sealing feature is used to secure point contact, contrary to line or surface contact, between the movable body in its various rest positions and the rest surface, which counteracts adherence, sticking and wedging to thereby maintain free body mobility and controlled switch forces in spite of the small movable body weight. According to another preferred embodiment the transmitter and/or the receiver are equipped with collimator lenses, able to concentrate the beam, which not only improve on shielding performance but also provide protection for the transmitter/receiver and may assist as suitable surfaces of point contact relative the body. Still another preferred embodiment is to use a body of a refractive material able to concentrate the beam, which generally requires a smaller body movement for a given beam alteration and which body type is made possible as heavy body materials are not necessary according to the principles of the invention. Less body movements in turn means less lateral space demands providing for smaller overall device size. Any radiation leakage resulting from non-sealing or point contact will be counteracted by any of the various inherent or optional efficiency compensations mentioned. Since the operation principles of the invention do not rely on complete sealing in prepared positions they are compatible with broad angle spectra, continuous response from varying tilt angles and both directional and non-directional rest surface guiding features. For similar reasons the device can easily be devised to give reproducible responses at all inclination angles, e.g. a predetermined response in upside-down orientation. According to the operation methods for the device a reliable position related output is secured by monitoring raw receiver data output and correct for among others random factors. Hereby hitherto used mechanical compensation means can be dispensed with and the above described advantages can be implemented to the fullest extent possible.

Further objects and advantages of the invention will be evident from the detailed description hereinbelow.

DETAILED DESCRIPTION

In broad terms the device of the invention includes a housing, the transmitter and receiver, the movable body and a rest surface for the body defining the movements and rest positions for the body.

The housing represents the point of reference for mounting or relative positioning of other parts and thereby indirectly the point of reference for the movable body positions and movements. "Housing" shall be understood in a broad sense to perform any one of several alternative functions. The housing may support the transmitter and receiver in their desired spatial relationship to secure the beam path therebetween, for which purpose the housing should at least provide fixation for these parts and, when a gap therebetween is present, extend over this gap. Nothing prevents use of integral transmitter/receiver components including both parts in fixed relationship in which case the housing may provide any complementary part for the present purposes. To the extent the rest surface includes parts separate form the housing and the receiver/transmitter parts the housing may also provide support for these rest surface-parts although, as will be described, it is generally preferred that the housing provides such complementary rest surfaces and for convenience the invention will be described in terms of this option unless otherwise indicated. The housing may be an open structure, e.g. in the form of a cage, although it is preferred to design the housing in such a way that it, at least together with other parts forms a substantially closed or even a sealed structure. In general terms the housing together with the transmitter and receiver parts together with an additional rest surface or other optional parts should provide a cavity confining at least the beam and the movable body. A sealed cavity may contain a dampening liquid as in the prior art but generally it is preferred to have air or gas filled cavities. The housing may provide additional functions such as fastening means for attachment to a support, preferably allowing mounting in several alternative directions for providing the desired output orientation, yet with convenient attachment to existing suitable supports in the apparatus to be served. The material in the housing may be metal but preferably plastic materials are utilized, which reduces weight and facilitate manufacture and which is acceptable owing to the low weight and wear of the movable body. Again assuming that the housing inner surface is exposed to the radiation it may be desirable to modify at least the surface and preferably the material as such to influence the radiation, e.g. to make the surface reflective, preferably difflusely, in order to generally increase radiation level in the cavity or to make possible an angled or indirect path between transmitter and receiver, to make the surface absorbing in order to reduce scattered radiation when relying on direct beam paths, to make the surface fluorescent in order to distinguish between direct and indirect radiation or to make the material generally non-transparent. As an example, for visible or infrared electromagnetic radiation carbon black can be used for absorbance and metal or titanium oxide as reflective materials. It is conceivable that the housing is composed of several discrete parts for example to give different properties but it is generally preferred and possible to provide the housing as an integral structure for simplest overall design. The modifications may need adaption to the radiation type used.

Any kind of radiation which can be shielded, refracted, transformed or otherwise altered by a movable body may be used in the device. Radioactive radiation, preferably a low energy and/or intensity alpha or beta radiation, may be employed with a radioactive radiator as transmitter and an ionizing sensor as a receiver. It is preferred to employ electromagnetic phenomena and the radiation in the present sense may then be an electric or magnetic field, the transmitter being the field generating device, the receiver a field alteration sensing circuitry and the movable body of a conductive, dielectric, paramagnetic or diamagnetic material. Most preferably the radiation is electromagnetic radiation with a suitable frequency range between ultraviolet and microwaves and most preferably in the optical and infrared regions. The transmitter may then be a maser or laser, lamps or most preferably light emitting diodes (LED's) which are preferably used for the visible and most preferably the infrared frequency range, such as between 300 to 3000 nanometers or between 500 to 2000 nanometers. Good results have been obtained in the visible area as well as infrareds in 950, 870 and 875 nanometers. The receiver should be adapted to the transmitter and for the above given types the receiver may be a photoresistor or better a photodiode or phototransistor. The receiver should be adapted in frequency to the transmitter or in case of fluorescence to any frequency resulting therefrom. For both transmitter and receiver frequency adaptation can be made by selection of type, by use of optical filters or application of electronic filters. For devices not operating in the visible range is suitable to incorporate a daylight filter to remove inadvertent surrounding influence.

Although the transmitter and receiver have been discussed in the present context as if discrete components, or integral components containing both at a mutual gap distance, the terminology shall be understood to include "transceivers" i.e. components performing both functions, simultaneously or interchangeably, either with the same active component performing both functions or preferably, for best adaptation, with separate components housed within the same enclosure. Transmitters, receivers and transceivers will hereinafter collectively be referred to as "active elements". All components shall be understood in broad sense and for example any component made to output a response to beam alterations shall be regarded as a receiver.

The beam between transmitter and receiver can be arranged in different manners. The beam may be reflected at least once before received, which allows for a free positioning of the active elements. The reflection can be allowed to more or less uniformly fill out the cavity, e.g. by repeated directional reflection or preferably by diffuse reflection on softened surfaces. The positioning freedom can be utilized to place transmitter and receiver in non-facing relationship, for example on the same surface facing in the same direction or in an angled e.g. perpendicular relationship to each other, for design reasons or to provide several receivers in prepared positions as known per se. It is generally preferred, however, to use a directed beam which improves on signal to noise level of special value at incomplete sealing, either unintentional or intentional, when relying or shielding rather than sealing to be further discussed. The directionality can be obtained in several ways for example passively by providing the receiver with a narrow take-up angle, by shielding or by a lens, or by making the cavity surfaces absorbing to defeat indirect radiation. Preferably it is obtained actively by concentrating the transmitted radiation towards the receiver, which optionally can be used in combination with the passive means mentioned. Concentration can be obtained by various means such as by use of a laser transmitter, shielding of the transmitter or preferably by use of lenses. Also with directed beams reflection can be allowed before reception and can be used for example to obtain any of the abovementioned design freedoms, although imaging reflectors rather than diffuse surfaces are then preferably used, and with preference the reflection can here additionally be used to assist in beam concentration e.g. by using concave surfaces. Also the movable body may be used as reflective surface, e.g. to increase scattering when in the beam path as a means for its detection.

A special way of implementing and using the positioning freedom provided by either diffuse or directional reflected radiation is to place the transmitter and receiver close to each other and facing in the same direction, or preferably a transceiver can be employed for the same purpose, with the movable body in the facing direction, suitably with one of its rest positions close to the arrangement. Alteration of the transmitted beam can take place in different ways. The movable body can have a less reflective surface than the background to create a stronger received signal when moved away from a close rest position or, conversely, the cavity can have a lower reflectivity than the body to give a higher received signal in the presence of the body. The arrangement requires a minimum of only one radiation opening and can be given a compact design.

A symmetrical and simple design preferred when using directed beams is to arrange discrete transmitter and receiver in an opposed arrangement facing each other, hereby relying less on reflected radiation and more on direct reception at the receiver of the transmitted radiation along an uninterrupted, but for the movable body, path. The beam should then be concentrated, by use of any of the means mentioned, towards the receiver and the transmitter and receiver preferably centered around a common beam axis. As long as the beam substantially falls on the target area it can be divergent, collimated to a parallel form or be convergent or focused on the target area. Said area can be defined by the projected cross-section of the movable body when at a rest position over the receiver or preferably said area is defined by the take-up area of the receiver, which also applies when the movable body has a rest position over the transmitter.

It should generally be noted that several transmitters and/or several receivers can be used in all of the abovementioned embodiments e.g. to extract more device position information or to increase on movable body position determination precision. In many instances it is, however, preferred and sufficient to have only one transmitter and one receiver.

As indicated above the manner in which the movable body alters the beam path can vary. Basically a "sealing" mechanism can be used wherein the receiver or the transmitter, or the chamber in which the part is housed, is more or less completely sealed off from remaining parts by the body occupying an opening to said part or its chamber, which generally requires a more or less perfect fit between body and opening including at least a circumferential line contact, better a circumferential surface contact, and a certain contact pressure therebetween. Such a sealing has the advantage of being quite independent of body and chamber absorptive, reflective or other optical properties as long as the body is opaque, and giving a strong signal difference with the body in the sealing and non-sealing positions respectively. In contrast, a "shielding" mechanism can with preference be used, in which complete sealing is not relied upon but rather a certain level of basic beam transmission is always maintained and predetermined degrees of beam reception alterations are made indicative of body movements. General advantages of the shielding method are that perfect sealing in discrete predefined positions is not necessary, that the method is compatible with a continuous or analog response to inclination, that the method is sensitive to the optical properties of body, cavity and chambers. which may be used to fine-tune device properties, and that the method is usable also with transparent and refractive movable wall materials. In addition the method has several exploitable advantages for small devices having minute movable bodies, by not requiring complete sealing, contact pressures, line or surface contact, but only point contact to be further discussed below, and yet being quite insensitive to contamination.

In addition to its main beam alteration effect of sealing off or shielding by shadowing the active elements various methods for increasing the registered output difference in response to movable body displacements can be utilized, some of which have been indicated above, and are of special value when the shielding method is used or when a sensitive continuous response to inclination is desirable. An amplified response in relation to body displacement can also be exploited to limit the necessary lateral body movement for a certain inclination detection, allowing a corresponding device size reduction in this direction. The movable body may be given contrasting absorptive properties compared to cavity surfaces, either more absorbing than the cavity or preferably less absorbing. In the latter case the body may be reflective in an imaging way, especially when focused radiation can be made to impinge on the body, or can be made diffusely reflective for highest reliability. Both cavity and body can be made of strongly absorbing quality, which by preference may be used in combination with highly directional beams. In addition to alteration methods based on opaque bodies is the option of using transparent bodies, which is possible owing to the material freedom provided by the invention, and a preferred way is to make the body both transparent and refractive which especially in combination with adapted directional ingoing beams can give an outgoing refracted beam with strongly increased sensitivity to displacement. The principle can be practiced in several ways, for example so that the received beam alterations from changes in shielding and changes in deflection positively interfere, e.g. by an adequately positioning of the receiver, or preferably conversely so that they negatively interfere to reduce received signal by refraction while shielding also is reduced and vice versa. A further possible alteration principle is to change the radiation frequency, for example by a fluorescence mechanism as above indicated or by a filtering out by absorption one or more of several discrete frequencies or a detectable part of a continuous spectra. The cavity surfaces may act to change the frequency, for example to permit distinction between direct and indirect radiation, or the movable body may act, by reflection or transmission, to change the frequency, for example to allow distinction between radiation impinged on/passed through and around the body respectively. The alteration methods may be used singly or in combination.

Although possible to use movable bodies of many shapes, such as polygonal, especially when response is desired in certain tilt- directions it is preferred to use a substantially spherical body. Body surface may be smooth but can also be given a structure for special purposes, such as a softened surface for diffuse reflection. For reasons touched upon it is desirable, especially for small movable bodies, to provide against body adherence, sticking and wedging that may prevent its intended free movement in the cavity and a certain surface structure may assist here, for example a multifaceted surface or numerous indentations such as on a golf ball. The material for the movable body can be selected fairly freely. Common metal materials can be used but, as operation does not depend on high body weights or contact pressures, other materials can be used as well such as glass or plastic materials, preferably crosslinked plastics such as polycarbonates, the latter types allowing for transparent and refracting bodies for abovementioned purposes. Low density materials, e.g. less than 3 and preferably less than 2 g/cc, may be used to reduce wear and improve on dampening. Any material used may be modified to achieve suitable optical properties, either in the form or a surface coating or, for best long term reliability, mixed into the body material. The modification may serve to increase or decrease radiation absorption or reflectivity or may act to change radiation frequency as described. Body size should be small and, expressed as the diameter of a sphere with corresponding volume, the diameter should be less than 10 mm, preferably less than 5 mm, better less than 3 mm, more preferably less than 2 mm and most preferably less than 1 mm, depending on application. Very small body sizes may be used to amplify the advantages outlined. A preferred manufacturing method for the smallest sizes is micromechanics, suitably with "linear" directional properties as will be explained an most preferably with the active elements integrated. Still the diameter could exceed 0.001 mm for best optical an dynamic properties and preferably also exceed 0.01 mm for non-integral mechanics and in the latter case most preferably exceed 0.1 mm The rest surface generally defines how the body will move or rest at various tilt angles for the device and, with the preferred arrangement of having the rest surface and the transmitter/receiver fixed in relation to each other, also how the body behaves in relation to the beam. The rest surface should provide for at least two rest positions with different beam alteration effects. By "rest position" shall be understood a position the movable body. can occupy and be moved to and from by gravity. The positions may be "discrete" in the sense that the positions are stable and require an activation energy for displacement therefrom or the positions may be "continuous" in the sense that the positions form a continuum or surface over which the body can freely move and occupy any position without other restrictions than possible friction. Continuous positions are mainly of interest when a continuous response in relation to tilt angle is desirable and can be provided in the form of a concave surface, which can have any suitable cross-section such as a circle segment for uniform body displacement with angle or any other curved section, e.g. to increase sensitivity for certain angles or to give a modified displacement response farther away from the beam. In many applications it is preferred to use at least one and preferably at least two discrete positions, which results in a "hysteresis" effect assuring that the device has to be tilted back a defined degree to remove the body from the position, compared with the tilt angle that brought it to the same position, e.g. to avoid repeated flipping between positions at certain angles. Suitable hysteresis angles can be between 0 and 45 degrees and preferably between 5 and 30 degrees. When using discrete positions it is further preferred that the surface between these positions is designed without any stable position for the body, e.g. by making this part convex or preferably flat, hereby providing for a "digital" response in which the body essentially either occupies one discrete position or another discrete position. The stability in the discrete positions can be provided in the form of a recess or groove into which the body may fall, preferably with sharp edge compared with body curvature in order to give a distinct edge effect. If more than two discrete positions are provided, when seen in a truly vertical cross-section reference plane in relation to gravity. they; will form a roughly concave surface, like in case of a continuous surface, although with a noncontinuous, e.g. polygonal, contour. The angle between neighboring rest positions can be anywhere between 0 and 180 degrees, normally between 30 and 170 degrees and preferably between 60 and 160 degrees. If desired continuous and discrete positions can be combined.

The rest surface may preferably provide rest positions all around the abovesaid vertical plane in order to give defined body positions in all these orientations, of special value in portable devices. The concave surface character may then extend all around the cavity cross-section contour for example to give a roughly symmetrical, although not necessarily identical, body response in a standard position and its corresponding upside-down position. In other applications it is preferred to limit the concave character to certain angles around a standard position and give a uniform response or a non-response in remaining positions. A preferred variety of this option is to let the body have substantially the same position at the extremes of the concave range and in the upside-down orientation, which can be obtained by letting the cross-section contour protrude in a convex manner, rather than being concave, into the cavity where it is desired to prevent body occupation. Independent of the total design at least one section of the contour should have the concave character giving response to tilt. At least parts near the beam but preferably all parts along the cavity contour should give defined body positions, which can be obtained by either clearly concave or clearly convex shape, unless flat areas are used between stable discrete positions as mentioned.

It is also preferred to adapt the cavity dimensions to the movable body main diameter so that in the positions the body can occupy, and preferably all such positions, the channels for the body formed by neighboring rest surface parts are limited in size in order to restrict body movements sideways to its intended movement between rest positions. This in order to provide more distinct responses and to reduce unnecessary wear. Hence it is preferred that such sideways dimensions are restricted to less than 2 and preferably less than 1.5 and most preferably less than 1.3 times the body main diameter. The body movements between rest surfaces for output response, generally lateral to the beam path, depend on the overall layout of the device. Still it is mostly of interest to limit the lateral extremes of said movements for size reasons and preferably the distance between said extremes is less than 5 times the body main diameter, preferably less than 4 and most preferably less than 3 times. Although optional means have been described making the output very sensitive to body displacement it is broadly of interest to allow for a distance between said extremes of at least 0.1, better at least 0.5 and most preferably at least 1 time body main diameter. These values are indicative only and may be adapted to the specific embodiment used. In particular, when using directed beams it is often of interest to allow for lateral body movements allowing complete non-shielding of the beam. Similarly when using a refractive body the smallest suggested lateral distances can be used owing to the strong beam deflection obtained for even small displacements. When using the abovesaid option of negative interference between the response from refraction and shielding respectively it may be of interest to limit lateral extremes to substantially the point where the response changes direction, e.g. when the reduction due to refractive displacement becomes less than the increase due to less shielding.

The device can be given directional properties to be only sensitive, or differently sensitive, at tilts in the abovesaid vertical reference plane compared to tilt components perpendicular to said plane, i.e. in different tilt "directions". Such "linear" properties can be achieved by limiting device depth or arranging guiding structures on the rest surface, e.g. in the form of ridges and valleys, allowing lateral body movements in said plane but preventing movements orthogonal thereto. If device depth is sufficient similar guiding structures can be used to provide one or several additional paths for the body at any horizontal angle to the firstmentioned reference plane, preferably normal thereto, and the different paths may cross at a vertex from which the body may move along a selected path depending on tilt direction. The various paths may have different tilt angle responses or may have the same response. The arrangement may also be used to prevent excessive rotational movements by the body, which is still compatible with roll independence or quasi rotational symmetry if numerous paths ray out from the vertex. For simplest design, and in many applications sufficient, is a substantially rotation symmetric rest surface structure, such as obtained by rotation of the described plane with cavity contour around a symmetry axis.

As indicated the beam path, and hence the positioning of active elements, may take a variety of forms such as straight in case of unobstructed beam path, angled in case of mirror reflection or cavity filling radiation or forth and back in case of transceiver type of arrangement, and positioning of the beam in relation to the rest surface may vary accordingly. The angled arrangement is suitable to combine with several receivers in defined positions, for example to distinguish between different tilt directions or preferably to distinguish between different tilt angles, and a preferred arrangement here is to give the transmitter a central position. e.g. at the abovedescribed vertex or symmetry axis, and the receivers around the lateral periphery or contour respectively. Preferably rest positions are arranged over at least one of the active elements. Straight beams are preferred, either the said unobstructed or the back and forth arrangement, and preferably then the beam is arranged centrally in relation to the cavity and preferably centrally and symmetrically in relation to the main concave character section of the rest surface. Further it is preferred that a rest position, most preferably a discrete rest position, is arranged over a transceiver and over at least one of the transmitter or receiver, preferably the latter, in a straight and unobstructed arrangement or over both in a upside-down symmetrical layout as described.

Positioning of the optically active elements can be made by direct incorporation of the element in the rest surface wall, by placement under said wall in case of transparent walls but preferably at or under an opening in said wall, which gives best design freedom e.g. for shielding and guiding the beam or to provide for a suitable rest surface for the body. A window may be provided for shielding purposes or to provide refractory properties. It is preferred to include a lens or lens system to affect the beam in any of the manners described, preferably a collimating lens to give a more concentrated beam or a focusing lens to give a convergent beam. The lens may be attached to the rest surface or opening but is preferably part of the active element itself. When using lenses at least one of the active elements, preferably the transmitter, should be so equipped but most preferably both elements are provided with lenses. The distance between transmitter and receiver of discrete design in straight paths with preference can be adapted to the above given channel distances for body movements between rest positions and sideways thereto where applicable respectively. It is suitable to seal off at least the active parts of the active elements, such as a window or opening thereof, against the rest surface or housing to avoid access or release of stray radiation. This can be done in a conventional manner by confining the active element in a chamber of its own. Preferably, however, the active elements are only partially enclosed in a manner such as to leave the rest of the element exposed, which can be obtained by attaching the element to the housing at least around the abovesaid active part or preferably around its main circumference with the enclosed part preferably sealed off in the above sense. The partial enclosure of the element assists in reducing overall device size, in using the elements as structural components and in exposing the element lead wires or other prepared connections for facilitated mechanical and electrical connection and fixation to a support such as a printed circuit board. The device of the invention is compatible with small elements, suitably in the range of 0.1 to 10 mm and preferably between 1 and 5 mm in main dimension over a cross-section parallel with the active part. Preferably the element component is larger than the movable body.

As indicated it is preferred to provide for point contact, rather than line or surface contact, between movable body and rest surface in at least one, preferably several and most preferably all of the cavity rest positions in order to secure free body mobility. A single contact point, such as between a ball and a surface, can be used but for reliability and dynamic stability purposes it is preferred to use at least two contact points, often sufficient for continuous rest positions for above given purposes or when continuous rest positions give the same a beam alteration result such as along a circumference centered along the beam axis, and for best. static stability it is preferred to use at least three contact points, often sufficient for discrete rest positions. A preferred way of arranging the at least two contact points for variable response purposes is to use the surface guiding structures of e.g. ridge and valley type mentioned in relation to directional properties generally over which structures the movable body may make dynamic contact at least two adjacent ridges. Three or more contact points can be provided by similar principles, for example by additional transverse guiding structures or preferably by arranging the rest position at a guiding structure vertex as described. A more general method, applicable also in combination with a truly rotational symmetric rest surface for response in all directions, is to provide a groove at the rest position which groove is non-congruent with the body, e.g. a square groove for a spherical body, giving point contact with any desired number of points. A preferred arrangement, securing highly reliable body mobility, is to combine any method providing at least two, but preferably at least three, contact points, for example according to any of the above given options, or even a line or surface contact, with a protruder in the form of a spike or any other structure giving an additional point of contact with the body, which point is preferably located within the circumference defined by the first-mentioned points and slightly lifts the body from the said first-mentioned points so as to eliminate contact with at least one of said first-mentioned points, and indeed eliminate any line or surface contact, that would otherwise be present. Without disadvantage the protruder may be located so as to provide several stable positions between it and any part of the first-mentioned points.

The point contact principles of the preceding paragraph can be combined with rest positions without any active element but can also with preference be used together with such an element. In the latter case the point contact principle generally means that less than complete radiation sealing is provided and that the shielding method, as defined, for detection is relied upon, not excluding that any alternative alteration method, such as refraction, may simultaneously be present. All the methods are compatible with this option, e.g. the ridge vertex or the non-congruent groove may be located over the element, the groove may be part of a hole over the element and the protruder may be coaxial with the element. A preferred manner of implementing the last alternative, not interfering with the beam or operation, is to use any radiation active part for protruder and with preference a lens arrangement can be used for this purpose.

The device described can be used for any purpose already known in the art, such as level sensor, alarm, safety switch, track sensor, control manipulator, accelerometer or any other purpose. The device has special utility in articles for intentional or unintentional repeated orientation in many directions such as portable devices, in small articles unable to conveniently house large sensors such as hand-held devices and articles on which high reliability and safety has to be placed such as safety, emergency or medical devices. As indicated the device may be used singly for either equal response around a symmetry axis or for different adapted responses in different directions. Several devices may be used in concert, for example directional devices arranged for response in different directions such as along three orthogonal axes.

Generally for fill utility the device should be combined with suitable electronics to drive the active elements and to extract and use the output provided. The nature of such auxiliary electronics is strongly dependent on the application used and is no primary object for the present invention. The electronics should at least be able to detect the output difference caused by the beam alterations from the movable body, either for extraction of continuous or discrete angle data and put it to use, e.g. in a simple switch, initiation or alarm or repeated or continuous monitoring.

The manner of using the present device need not be different from that of the prior art. Generally similar devices have been used in such a manner that the output from the receiver simply has been monitored during movement thereof and at a certain output level a signal has been emitted to trigger any of the activities mentioned above. The output from the present device can be treated in the same manner. For several reasons it is preferred, however, to provide a use method treating the output signal in a more sophisticated manner. Firstly, more user information may be extracted from the signal. Secondly, signal information may be used to compensate for random factors in the device response to extract a more reliable treated signal. Thirdly, previous hardware feature may be replaced by software e.g. to permit a smaller or simpler device.

Accordingly the invention provides a method for operating the device wherein device output is monitored for its amplitude versus time function, directly or indirectly, and the function processed before an activity is based thereon. The function obtained and treated as continuous but it is preferred that values are sampled from the device output, which may be made at irregular but preferably at regular time intervals at a certain frequency. Sampling can be in any of several known ways. The sampling may be digital in the sense that the amplitude is compared with a reference level and either set to a binary 1 or a binary 0 depending on whether the amplitude is above or below the reference level, which may be varying but preferably is fixed. Among others for extracting more information from the raw data an analog sampling method is generally preferred, in which the function absolute amplitude value is repeatedly registered. The analog value can be processed in an analog processor but it is mostly preferred to convert the value to digital form and process it in a digital processor. The signal may in a manner known per se be filtered to remove certain frequency ranges.

The function values may be memorized and processed at any time and rate but real time processing is generally preferred in most applications, which may still require some memorizing of the values to be simultaneously processed at any given time. It is preferred that the processing involves at least two, preferably three and most preferably a multiple of function values at a time. Processing may take place in any known kind of processor, preferably comprising a microcontroller such as a standard microprocessor or an application specific integrated circuit.

The processing may be operative to extract any kind of body movement or tilt versus time information for recording or immediate action for any of the purposes exemplified. It is preferred, however, that the processing additionally serve to modify the raw signal from the device to make it more reliable for its intended purpose, some of which modifications will be exemplified.

The processing may perform an analogue to a physical dampening of the body movement. In continuous rest positions this may be achieved for example by filtering out certain frequencies, averaging out movements around an equilibrium point or extrapolating a regression curve. In discrete rest positions a similar result may be based on delayed or repeated check for amplitudes corresponding to a body position corresponding to a stable rest position.

The processing may perform calibration of the device, for example by recording the actual device output at defined inclination angles, either staticly e.g. for discrete rest positions. or dynamically for continuous rest positions, and/or device response to various disturbances for example in respect of changes on driving conditions, ambient conditions etc.

The processing may perform an analogue to provision of physical hysteresis for body movement for example by requiring a certain degree of amplitude alteration for emitting a signal corresponding to a change from one rest position to another, e.g. to suppress frequent flipping around an equilibrium angle.

The processing may act to lay down decision criteria for actions to be taken, for example amplitude levels to be interpreted as significant for critical inclinations or amplitude ranges forbidden for actions.

DESCRIPTION OF DRAWINGS

Figure 1A:
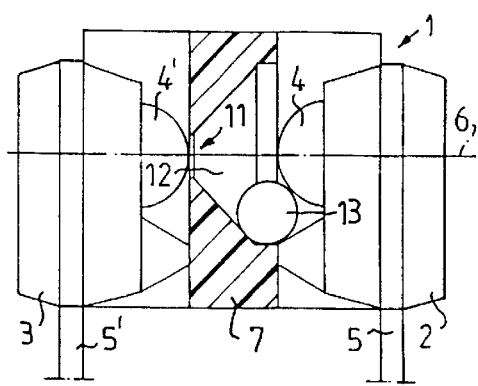
FIGS. 1A and 1B show partially in section a first embodiment of the device having discrete transmitter and receiver components when in horizontal and vertical orientations respectively.
Figure 1C:
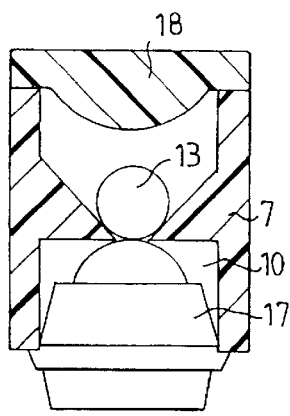
FIG. 1C shows a modification of the device of FIGS. 1A and 1B utilizing a transceiver.
Figure 1B:
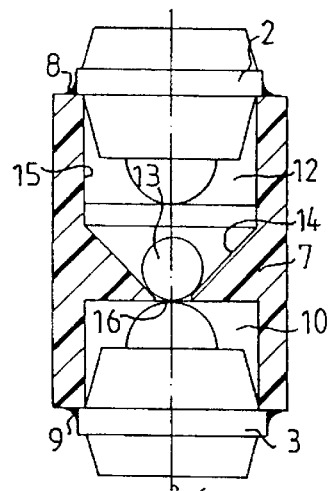

The device of FIGS. 1A and 1B, generally designated 1, comprises a discrete transmitter 2 in the form or a light emitting diode and a discrete similarly shaped receiver 3 in the form of a phototransistor, both being equipped with convex collimating lenses 4 and 4' and electrical lead wires 5 and 5'. A beam axis between transmitter and receiver is indicated in phantom line at 6. A housing part 7 has rotation symmetry around beam axis 6 and has a generally cylindrical outer mantle surface ending in annular surfaces 8 and 9 to which transmitter 2 and receiver 3 respectively are attached by gluing at their largest mid-section flanges so that their front parts extend into the housing and their remaining parts are left unconfined. The confined part of receiver 2 is located in a chamber 10 with an opening 1 1 to the cavity 12 formed by the inner surfaces of housing 7 and transmitter 2. The rest surfaces for the movable spherical body 13 are formed by at least three parts; the inner frusto-conical part 14 of housing 7, providing a generally concave floor, the cylindrical inner part 15 of the housing and the protruding front parts of transmitter 2, providing a generally inwardly extending convex surface. Since the conical surface 14 provides a substantially straight rolling line for the body 13 and since the protruding parts of transmitter 2 with lens 4 gives a generally convex surface without stable positions for the body, the rest surface as a whole offers substantially two discrete rest positions for the body, one at the vertex of housing part 14, immediately over opening 11 and receiver 3, as shown in FIG. 1B, and the other at the circumference of cylindrical housing part 15, as shown in FIG. 1A. The latter position is stable also in an upside down orientation due to the limited movement channels provided between housing 7 and in particular the lens 4 or transmitter 2. Although the body 13 may circulate around the circumferential surface 15 of the housing in the rest position of FIG. 1A it has always the same alteration effect on the beam due to the symmetrical nature of such movement in relation to beam axis. In both rest positions the body 13 has point contact only with its rest surfaces. In the position of FIG. 1A surfaces 14 and 15 have different radius in relation to the body 13 and give only point contact like the convex lens 4. In the position of FIG. 1B special means are provided to give point contact. At the opening 11 the body 13 could theoretically have a circumferential line contact, but this is prevented by positioning the receiver 3 so that its lens 4' slightly lifts the body 13 from the opening at 16 so that only two contact points results. one with the lens 4' and one on the surface 14. Also in this rest position the body could conceivable rotate around the symmetry axis 6 without alteration effect on the beam. All in all, the advantages are obtained in a roll independent device. In FIG. 1C transmitter 2 and receiver 3 have been replaced with transceiver 17 and the position of transmitter 2 has been replaces with a closure 18 having an inwardly convex surface. To amplify the alteration effect housing 7, closure 18 and chamber 10 surfaces can be made radiation absorbing whereas body 13 may be reflective in either diffuse or imaging way.

Figure 2:
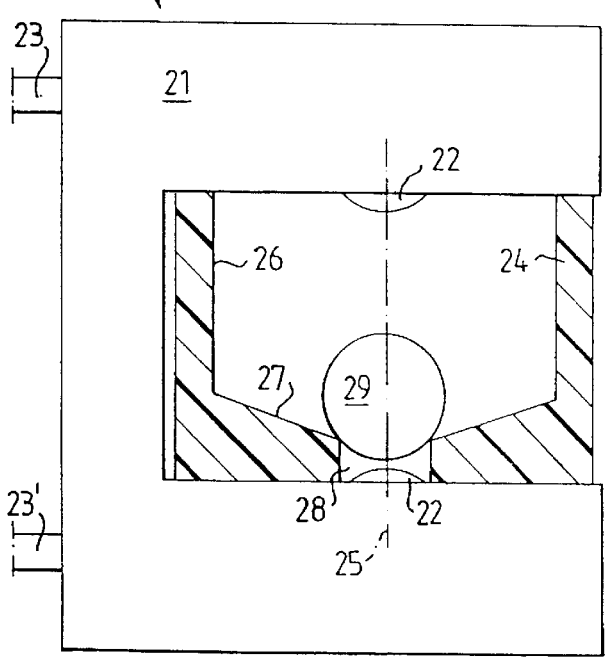
FIG. 2 shows in partial section a second embodiment of the device utilizing an integral transmitter/receiver component.

FIG. 2 shows schematically and not to scale a sensor device 20 embodiment utilizing a commercially available (e.g. ISOI Sharp 24) type of integral transmitter/receiver component 21 arranged in a fork type enclosure at a defined gap between the active elements. The active elements have each a lens 22 and 22' and connecting lead wires 23 and 23'. A housing part 24 forms an insert in the gap between the active elements and has an around axis 25 rotational symmetrical form and is manufactured from a plastic, e.g. plexiglass or polycarbonate, rod slice in which a bore has been formed with a turn lathe, which bore has a cylindrical part 26, a frusto-conical part 27, acting as a convex rest surface, and a narrow cylindrical part 28 forming an opening over lens 22'. Movable body 29 is shown in a first rest surface position over the opening 28. In the position shown body 29 has circumferential line contact with opening 28 but as in the previous embodiment it is possible to lower the housing 24 so as to lift the body by lens 22' to provide point contact. Housing 24 together with the upper part of component 21 create a cavity confining body 29 and the beam. The function is similar to the embodiment of FIG. 1, i.e. the body have a second rest position at the cylindrical surface 26 and may be prevented from blocking the beam in upside down orientation by the presence of lens 22.

Figure 3A:
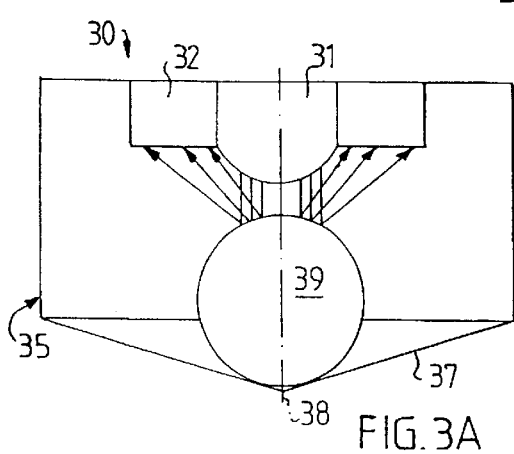
FIGS. 3A, and 3B show schematically third embodiments of the device utilizing a transceiver type of active element facing in the same direction.
Figure 3B:
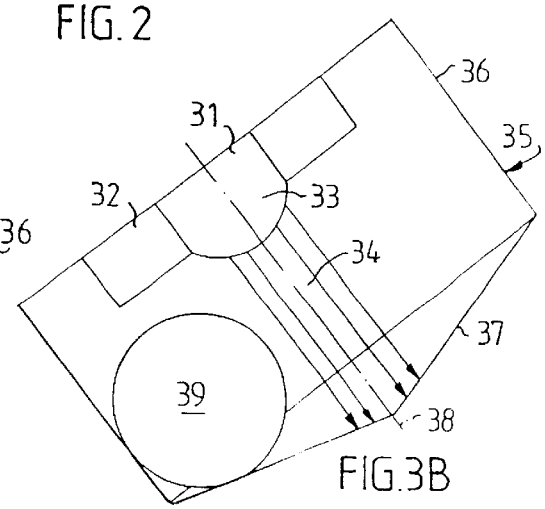

FIGS. 3A and 3B show in schematic form a device 30 in which transmitter 31 and receiver 32 are facing in the same direction, the receiver being in the form a ring surrounding the transmitter. The transmitter 31 has a collimating lens part 33 giving a roughly parallel beam 34. The housing 35 is a simple shell with a cylindrical part 36 and a conical part 37 and has rotational symmetry around axis 38. Movable body 39 is reflective in an imaging way and the interior of the housing 35 is made absorbing to the radiation. In FIG. 3A the body position is symmetrical with the beam and the arrangement of active elements and the radiation beam 34 from the transmitter 31 is reflected against the body 39 towards the annular receiver 32 whereas scattered radiation is substantially absorbed by the walls of the housing 35. In the body 39 position of FIG. 3B the beam 34 passes the beam and is substantially scattered and absorbed by the housing surfaces. Although the device is roll independent in design it may indicate tilt directions if the annular receiver 32 is made of several independent reception spots.

Figure 4A:
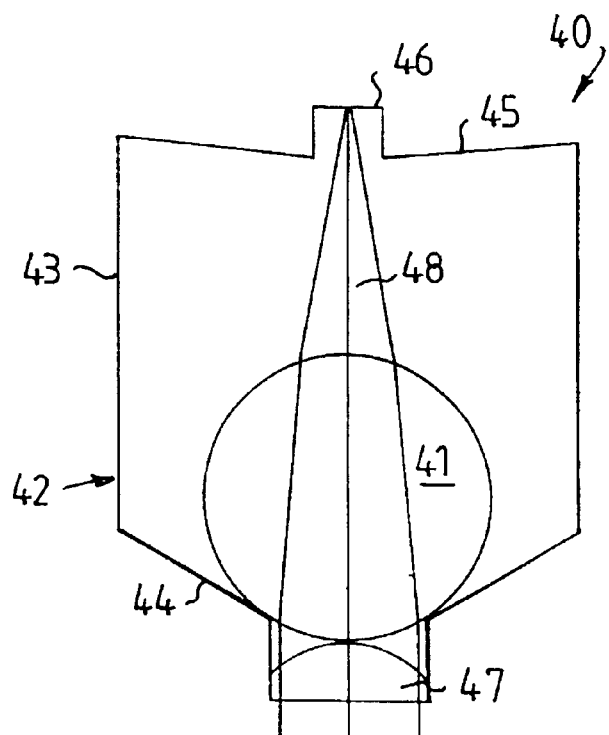
FIGS. 4A and 4B shows in section a fourth embodiment of the device utilizing a transparent and refractive movable body.
Figure 4B:
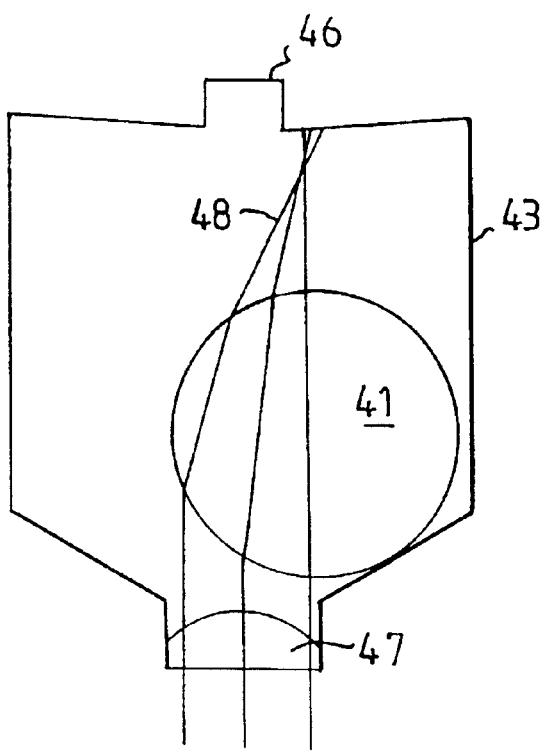

FIGS. 4A and 4B show in schematic form a device 40 utilizing a transparent and refractive body 41 in a housing 42 having cylindrical part 43, frustoconical part 44 and an inwardly protruding top part 45. The top part 45 has an opening to a shielded receiver 46 and the frustoconical part 44 has an opening to a transmitter with lens 47 giving a substantially parallel outgoing beam. In FIG. 4A the refractive body 41 position is symmetrical with the axis between transmitter and receiver and the body refracts the ingoing beam from lens 47 to a converging outgoing beam 48, roughly focused on receiver 46. In FIG. 4B body 41 has moved by tilt or acceleration of the device 40 to a new rest position close to the cylindrical housing part 43. Although not drawn to exact scale the FIG. illustrates that the relatively small body displacement, only a fraction of its diameter, gives an outgoing beam 48 focused lateral to the receiver 46, virtually nullifying its response. As in previous embodyment the cavity surfaces can be absorbing to defeat scattered radiation.

Figure 5A:
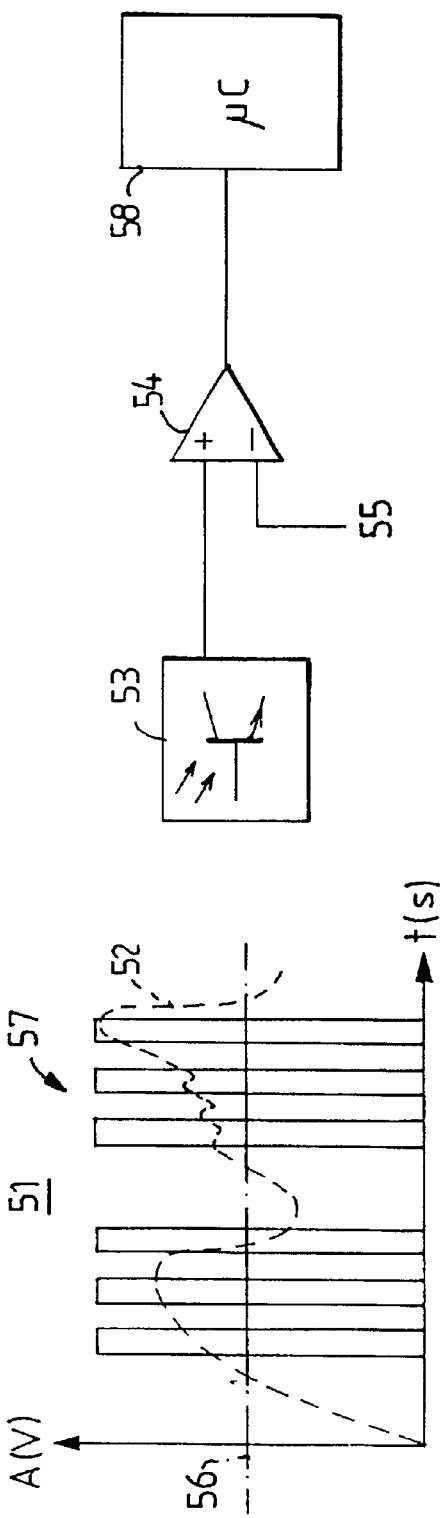
FIGS. 5A and 5B illustrates schematically device output signal treatment methods.
Figure 5B:
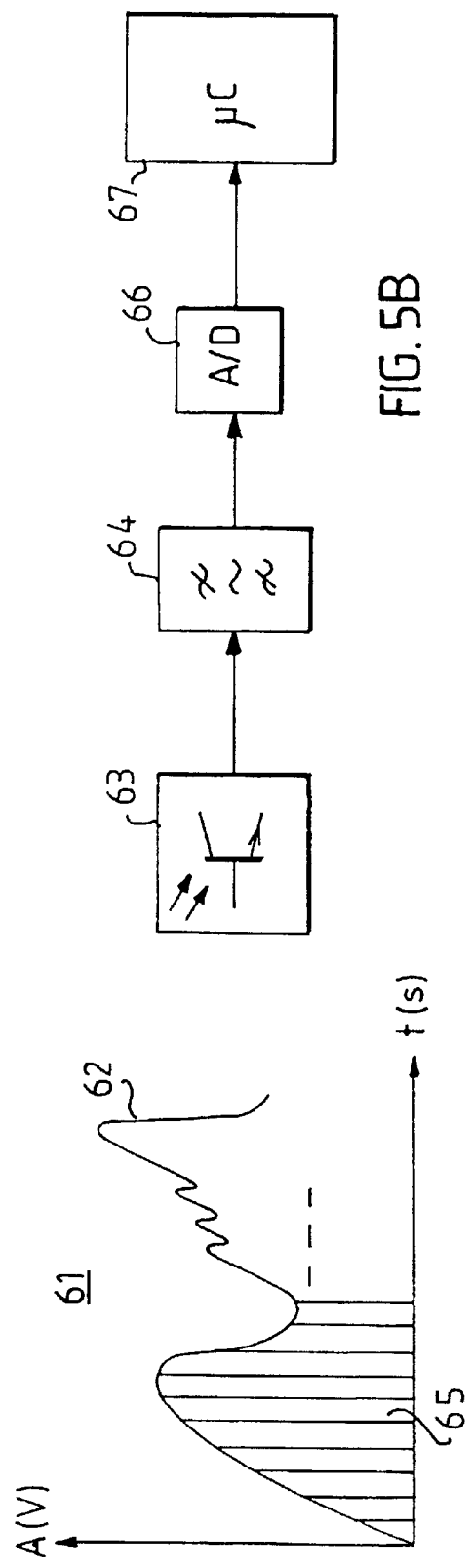

FIGS. 5A and 5B give a schematic representation of a device output signal treatment method, wherein FIG. 5A is based on a digital and FIG. 5B is based on an analog sampling method. In FIG. 5A the diagram 51 to the left shows a curve 52 of amplitude versus time assumed to be a continuous output from the phototransistor receiver 53. The output is fed to a comparator 54 to which is also fed a reference level signal 55, which level is indicated with line 56 in diagram 51, and an output from the comparator 54 is a train of binary digits as illustrated at 57 in the diagram 51. The binary train is fed to a microcontroller processor 58 for further processing, which may include production of signal modified according to any of the general principles outlined. Similarly FIG. 5B shows in diagram 61 schematically the same curve 62 being the output of phototransistor 63. A filter 64 may be used to eliminate certain frequency ranges such as non representative high and low oscillations. In the A/D transformer 66 the varying amplitude curve is sampled at frequent equidistant points in time, as indicated at 65, and the corresponding amplitude values are transformed to digital values. The digital values and are then fed to a microcontroller 67 for further processing according to the above.

For convenience the various exemplified embodiments have been described in simplified and unified nature. All exemplified embodiments can be modified to include the various options described in the Detailed description section. For example, the generally concave rest surface floor has been shown as simply conical although it is clear that it can be modified to a continuous rest surface type or discrete with stabilizing recesses. Similarly the embodiments are shown omnidirectional and rotation symmetrical although they can equallay well be directional or asymmetrical as described. The shown cylindrical housing parts and inwardly protruding top parts can be replaced with continuous or discrete rest surfaces all around the vertical section reference circumference plane. The various beam alteration and output amplifying methods described can be employed as well.

What is claimed is:

1. A tilt sensing device comprising a) a housing, b) a radiation transmitter and a radiation receiver arranged in or at the housing to form a beam path therebetween, c) a radiation obstructing or deflecting body movable in relation to the beam path, d) a rest surface for the body defining at least two possible rest positions for the body relative to the beam path, between which rest positions the body can move by gravity at defined tilt angles for the device and which rest positions are selected to give a detectable output difference from the radiation receiver depending on which of the rest positions is occupied by the body, and e) at least one collimating or convergent focusing lens for direction of the beam, wherein, in at least one rest position, the rest surface is arranged to give point contact only against the body.

2. The device of claim 1, wherein the size of the movable body is less than 3 mm and exceeds 0.01 mm.

3. The device of claim 1, wherein the housing includes at least part of the rest surface.

4. The device of claim 1, wherein the housing forms part of a cavity confining at least the beam and the movable body.

5. The device of claim 4, wherein the cavity contains gas.

6. The device of claim 1, wherein the radiation comprises electromagnetic radiation with a frequency range between microwaves and ultraviolet.

7. The device of claim 1, wherein the transmitter comprises a light emitting diode and the receiver comprises a photodiode or phototransistor.

8. The device of claim 1, wherein the transmitter and receiver comprises a transceiver.

9. The device of claim 1, wherein transmitter and receiver are arranged facing substantially in the same direction.

10. The device of claim 1, wherein transmitter and receiver are oppositly arranged facing each other at a mutual distance.

11. The device of claim 1, wherein said output difference is based on an incomplete shielding mechanism in which a certain level of transmission is maintained and levels of shielding are made indicative of body position.

12. The device of claim 1, wherein the movable body has contrasting absorptive properties with respect to its surroundings.

13. The device of claim 1, wherein the body is transparent and refractive in relation to the radiation.

14. The device of claim 1, further comprising means for detectably changing the radiation frequency between transmitter and receiver.

15. The device of claim 1, wherein the body is roughly spherical.

16. The device of claim 1, wherein the body has, relative to the body size, small and numerous irregularities.

17. The device of claim 1, wherein the rest surface comprises at least one surface with continuous rest positions over which the body can freely move in response to various tilt angles.

18. The device of claim 1, wherein the rest surface comprises at least one discrete rest position arranged to maintain the body stably and wherein an activation energy is required for displacement of the body therefrom.

19. The device of claim 18, wherein the discrete rest position is arrange to provide a hysteresis in angles for displacement to and from the position respectively.

20. The device of claim 18, wherein at least two discrete rest positions are provided, without any stable position for the body therebetween.

21. The device of claim 1, wherein the rest surface provides rest positions all around the circumference of a cross-section reference plane through and parallel with the beam path.

22. The device of claim 21, wherein the circumference comprises a contour section with concave character and a contour section with inwardly protruding or convex character to prevent body occupation.

23. The device of claim 1, wherein the rest surface provides extremes for body movements lateral to the beam, the distance between which extremes is less than 5 times the body main diameter and more than 0.5 times said diameter.

24. The device of claim 1, wherein, in respect of a cross-section reference plane through and parallel with the beam path, the rest surface gives different outputs for a tilt in a direction moving the body within said plane and for a tilt direction moving the body at an angle with said plane, respectively.

25. The device of claim 1, wherein, in respect of a cross-section reference plane through and parallel with the beam path, the rest surface gives substantially the same output for tilt directions moving the body within said plane and for a tilt direction moving the body at an angle with said plane, respectively.

26. The device of claim 25, wherein the rest surface is substantially rotationally symmetrical based on rotation of said reference plane.

27. The device of claim 1, wherein the transmitter and receiver are at least partially sealed off against the rest surface or the housing.

28. The device of claim 27, wherein the sealing is made so as to only partially enclose the transmitter and receiver.

29. The device of claim 1, wherein at least one of the transmitter and the receiver is larger than the movable body.

30. The device of claim 1, wherein the rest surface is arranged to give at least two contact points.

31. The device of claim 30, wherein at least one contact point is provided by a protruder in the form of a spike, which contact point is located outside a line between two other contact points or within a circumference defined by three or more contact points and slightly lifting the body from three or more points.

32. The device of claim 1, wherein the contact points are provided at a recess in the rest surface, which recess is non-congruent with the body.

33. The device of claim 1, wherein the rest position is arranged in the beam path.

34. The device of claim 33, wherein said lens is arranged to give at least one contact point against the body.

35. A tilt sensing device comprising a) a housing, b) a radiation transmitter and a radiation receiver arranged in or at the housing to form a beam path therebetween, c) a radiation obstructing or deflecting body movable in relation to the beam path, and d) a rest surface for the body defining at least two possible rest positions for the body relative to the beam path, between which rest positions the body can move by gravity at defined tilt angles for the device and which rest positions are selected to give a detectable output difference from the radiation receiver depending on which of the rest positions is occupied by the body, wherein the body is transparent and refractive in relation to the beam radiation.

36. The device of claim 35, wherein the size of the movable body, expressed as the diameter of a sphere of corresponding volume, is less than 10 mm.

37. The device of claim 35, wherein the size of the movable body is less than 3 mm and exceeds 0.01 mm.

38. The device of claim 35, wherein the housing includes at least part of the rest surface.

39. The device of claim 35, wherein the housing forms part of a cavity confining at least the beam and the movable body.

40. The device of claim 39, wherein the cavity contains gas.

41. The device of claim 35, wherein the radiation comprises electromagnetic radiation with a frequency range between microwave and ultraviolet.

42. The device of claim 35, wherein the transmitter comprises a light emitting diode and the receiver comprises a photodiode or phototransistor.

43. The device of claim 35, wherein the transmitter and receiver comprise a transceiver.

44. The device of claim 35, wherein the beam is directed.

45. The device of claim 44, further comprising at least one lens for direction of the beam.

46. The device of claim 35, wherein the transmitter and receiver are arranged facing substantially in the same direction.

47. The device of claim 35, wherein the transmitter and receiver are oppositely arranged facing each other at a mutual distance.

48. The device of claim 35, wherein the output difference is based on an incomplete shielding mechanism in which a certain level of transmission is maintained and levels of shielding are made indicative of body position.

49. The device of claim 35, wherein the movable body has contrasting absorptive properties with respect to its surroundings.

50. The device of claim 35, further comprising means for detectably changing the radiation frequency between transmitter and receiver.

51. The device of claim 35, wherein the body is roughly spherical.

52. The device of claim 35, wherein the body has, relative to the body size, small and numerous irregularities.

53. The device of claim 35, wherein the rest surface comprises at least one surface with continuous rest positions over which the body can freely move in response to various tilt angles.

54. The device of claim 35, wherein the rest surface comprises at least one discrete rest position arranged to maintain the body stably and wherein an activation energy is required for displacement of the body therefrom.

55. The device of claim 54, wherein the discrete rest position is arranged to provide hysteresis in angles for displacement to and from the position respectively.

56. The device of claim 54, wherein at least two discrete rest positions are provided, without any stable position for the body therebetween.

57. The device of claim 35, wherein the rest surface provides rest positions all around the circumference of a cross-section reference plane through and parallel with the beam path.

58. The device of claim 57, wherein the circumference comprises a contour section with concave character and a contour section with inwardly protruding or convex character to prevent body occupation.

59. The device of claim 35, wherein the rest surface provides extremes for body movements lateral to the beam, the distance between which extremes is less than 5 times the body main diameter and more than 0.5 times the diameter.

60. The device of claim 35, wherein, in respect of a cross-section reference plane through and parallel with the beam path, the rest surface gives different outputs for a tilt in a direction moving the body within the plane and for a tilt direction moving the body at an angle with the plane, respectively.

61. The device of claim 35, wherein, in respect of a cross-section reference plane through and parallel with the beam path, the rest surface gives substantially the same output for tilt directions moving the body within the plane and for a tilt direction moving the body at an angle with the plane, respectively.

62. The device of claim 60, wherein the rest surface is substantially rotationally symmetrical based on rotation of the reference plane.

63. The device of claim 35, wherein the transmitter and receiver are at least partially sealed off against the rest surface or the housing.

64. The device of claim 63, wherein the scaling is made so as to only partially enclose the transmitter and receiver.

65. The device of claim 35, wherein at least one of the transmitter and the receiver is larger than the movable body.

66. The device of claim 35, wherein, in at least one rest position, the rest surface is arranged to give point contact only against the body.

67. The device of claim 66, wherein the rest surface is arranged to give at least two contact points.

68. The device of claim 66, wherein the contact points are provided at a recess in the rest surface, which recess is non-congruent with the body.

69. The device of claim 66, wherein the rest position is arranged in the beam path.

70. The device of claim 69, wherein a lens is arranged to give at least one contact point against the body.

* * * * *